United States Patent Office 3,366,487
Patented Jan. 30, 1968

3,366,487
CULINARY MIXES CONTAINING FRACTIONATED AMYLOPECTIN AND STARCH
Donald H. Hughes and William T. Bedenk, Cincinnati, and Norman B. Howard, Hamilton, Ohio, assignors to The Procter & Gamble Company, Cincinnati, Ohio, a corporation of Ohio
No Drawing. Filed June 14, 1965, Ser. No. 463,857
9 Claims. (Cl. 99—94)

This invention relates to dry prepared culinary mixes containing sugar, flour, and shortening from which baking batters can be prepared by the addition of liquid materials. More particularly, this invention involves the addition of amylopectin and certain starches to such mixes to improve the moisture characteristics of products prepared therefrom.

So-called "dry" prepared mixes used for baking are made by combining sugar, flour, shortening, and other ingredients including leavening, milk solids, egg solids, flavoring, and coloring, to form a free-flowing granular mixture. To prepare these dry mixes for baking, liquid materials such as water, milk, and eggs are added, and the combination is beaten to form a homogeneous mixture and to incorporate air. The resulting batter is then baked.

Moistness has long been recognized as one of the most important characteristics of baked products, particularly layer cakes. The moistness of a layer cake is directly related to the amount of water that is incorporated into the dry prepared mix at the time it is prepared for baking; however, when water in excess of a fixed, predetermined level is added to any particular mix in the attempt to promote a more moist product, an undesirable pasty or gummy cake results. It has long been deemed desirable to be able to add greater amounts of water to a prepared mix so that more moist and delectable cakes can be obtained. Heretofore this has not been possible without sacrificing the other properties of the product such as good crust appearance, tenderness, and freedom from undue gumminess and pastiness.

It has now been discovered by means of the present invention that dry mixes can be provided which will produce layer cakes having increased moisture levels and which at the same time have all of the other desired characteristics commonly associated with delectable cakes.

Accordingly, it is an object of this invention to provide dry prepared culinary mixes containing ingredients which cooperate to increase the tolerance of the mix for water.

Another object is to provide culinary mixes to which increased levels of water can be added.

Still another object is to provide culinary mixes from which delectably moist layer cakes can be made.

A further object is to provide culinary mixes from which layer cakes can be made having desired moistness for an extended time.

Still a further object is to provide culinary mixes from which layer cakes can be made having enhanced moistness characteristics and having desired eating qualities and physical characteristics.

It is an additional object of this invention to provide a method of enhancing the moisture characteristics of culinary mixes and layer cakes prepared therefrom.

In general this invention comprises a dry, prepared culinary mix containing sugar, flour, shortening, and special ingredients which cooperate to enhance the moisture characteristics of the mix and layer cakes prepared therefrom. These moisture enhancing ingredients are: (1) amylopectin, which is present in the dry culinary mix in an amount ranging from about 0.1 to about 4.0% by weight of the dry mix, preferably from about 0.25 to about 1.50% by weight of the dry mix; (2) a starch having a gelatinization temperature higher than that of wheat starch, which is present in the dry culinary mix in an amount ranging from about 1.0 to about 5.0% by weight of the dry mix, preferably, from about 2.0 to about 3.0% by weight of the dry mix; and, optionally (3) starch phosphate, which can be present in the dry culinary mix in an amount ranging from about 0.05 to about 3.0% by weight of the dry mix, preferably from about 0.25 to about 0.50% by weight of the dry mix.

Ordinary starch consists of two types of polymers of glucose; the linear polymer called amylose (sometimes referred to as the "A fraction"), and the branched chain polymer called amylopectin (sometimes referred to as the "B fraction"). The amylose molecule is considered to be a long linear chain of anhydroglucose units. The amylopectin molecule, on the other hand, is considered to be a larger complex branched chain of tree-like structure with many of the branches themselves having branches and so on.

The relative content of amylose and amylopectin varies with the source of the starch. For instance, depending somewhat on the analytical technique used, it has been estimated that tapioca starch contains from 17% to 21% amylose, potato starch 20% to 25% amylose, corn starch 22% to 30% amylose, the remainder of the starch in each instance being amylopectin.

Although normal varieties of starch such as wheat starch are comprised of about 1 part amylose and from about 3 to about 6 parts amylopectin, some genetically controlled hybrids of corn, sorghum or other crops contain almost 100% amylopectin. For instance, the starches in waxy corn which is a genetically controlled hybrid, consist essentially of amylopectin. Other such high amylopectin starches are waxy maize, waxy sorghum, and certain tapioca hybrids.

The amylopectin to be included in the culinary mixes of the present invention must be derived from the separation of starch, i.e., it must be the amylopectin fraction obtained when starch is separated into its amylopectin and amylose components.

Surprisingly, even though normal sources of starch such as corn or wheat contain up to about 80% amylopectin and some hybrid sources of starch such as waxy corn can contain up to about 100% amylopectin, starches derived from these sources are not per se satisfactory for use as the amylopectin ingredient in the culinary mixes of this invention. Any of the above named sources of starch can be used but the amylopectin ingredient must be isolated therefrom. Therefore, as used hereinafter and in the accompanying claims, the term "amylopectin" refers to the isolated amylopectin fraction of starch.

For instance, amylopectin derived from the fractionation of starch according to the processes of U.S. Patents 2,829,987, 2,829,988, 2,829,989, 2,829,990, all issued Apr. 8, 1958 to Bus et al. can be used in the culinary mixes of this invention. The processes of Bus et al. are particularly applicable to potato starch and involve a salting out principle. In a particular embodiment of Bus et al. and 8 to 12% starch suspension is mixed with a 10 to 15% aqueous buffered solution of magnesium sulfate. The mixture is quickly heated to 310° F. It is held at 310° F. for about 15 minutes and then rapidly cooled to 160° F. The amylose precipitates out completely and is separated by centrifuging. The mother liquor is cooled to about 70° F. to settle out the amylopectin which is then vacuum filtered, washed with cold water, dried and pulverized.

Especially advantageous results are realized when the amylopectin used in the culinary mixes of this invention is derived from the fractionation of starch according to the process of U.S. Patent 3,067,067, issued Dec. 4, 1962 to Etheridge et al. In general, the process of Etheridge et al. involves heating a starch slurry to about 250° F. under pressure to prevent boiling. The resulting solution is cooled quickly to its atmospheric boiling point, then further cooled slowly to 120° F., as amylose crystals form. After the amylose crystals are recovered, the solution is further cooled to precipitate substantially pure amylopectin.

Corn amylopectin derived from the fractionation of corn starch according to the process of U.S. Patent 3,067,067 is preferred for use in the culinary mixes of this invention. If amylopectin other than the corn amylopectin derived by the process of U.S. Patent 3,067,067 is used, then it is highly preferable to fortify the amylopectin by adding starch phosphate to the dry mix in an amount of from about 0.05 to about 3.0% by weight of the dry mix.

Starch phosphates, which are chemically modified starches i.e., starches that have been cross-linked with phosphorus, can be prepared by the reaction of starch and phosphorous oxychloride in the presence of a hydrogen chloride acceptor, usually pyridine. Other methods for the preparation of starch phosphates are found in U.S. Patents 2,824,870 and 2,865,762, issued Feb. 25, 1958, and Dec. 23, 1958 respectively to Neukom.

The exact starch phosphate to be used in the mixes of this invention is not critical. Commercially available "standard grade" starch phosphate is quite acceptable for use herein. However, the use of starch phosphate is optional and is especially desirable only when the preferred corn amylopectin is not used, although it can be advantageously used with this preferred material.

Amylopectin obtained from any of the named sources or methods can be combined for use as the amylopectin ingredient in the mixes of this invention. If such combinations are used, the starch phosphate is preferably used also only when the preferred corn amylopectin is not a member of such combination.

The other critical ingredient in the culinary mixes of this invention, in addition to amylopectin, is a starch having a gelatinization temperature higher than that of wheat starch, i.e., higher than about 131° F. The gelatinization temperature of a starch is the temperature at which the starch starts to lose its birefringence. Examples of such starches are pineapple starch, corn starch, arrowroot starch, rice starch, starch derived from sorghum, tapioca, barley, oats, rye and the like or any starch having a gelatinization temperature higher than that of wheat starch. Rice starch, pineapple starch, and corn starch give especially advantageous results.

The amylopectin and starch ingredient cooperate to allow available water in the batter to be taken up or absorbed in a fashion different from that of ordinary culinary mixes. A precise theory explaining this novel cooperative effect between amylopectin and starch is not readily discernable but it is believed to involve the mode in which water is held: The starch ingredient alone takes up an excess of water by swelling, yet it does not gel because of its high (higher than wheat starch) gelatinization temperature. When amylopectin and the starch are combined in the proportions described herein the ability to hold an excess of water is enhanced and the water is held in a loose, more random manner which enables very satisfactory moist-tasting cakes to be prepared.

Dry mixes suitable for the practice of this invention must contain sugar, flour and shortening as well as the essential amylopectin and starch ingredients. Additional ingredients such as milk solids, hydrophilic colloids, leavening and flavoring are added to provide the specific type of product desired.

Suitable sugars include any of the commonly used granular sugars such as sucrose, dextrose, maltose, fructose, lactose and brown and invert sugars. The sugar can also be in powder form and mixtures of more than one type of sugar can be used.

The flour can be the usual bleached cake flour although a good general purpose flour can be substituted for such cake flour especially if appropriate emulsifiers are provided in the shortening. The ratio of sugar to flour can be adjusted as necessary for special circumstances but a ratio of sugar to flour in excess of 1:1 has long been known to result in particularly good cake mixes which are often referred to as "high-ratio" cakes. Cakes in which the ratio of sugar to flour is less than about 1:1 are generally referred to as "low ratio" cakes.

The shortenings which can be employed in the culinary mix systems of this invention include solid or plastic as well as liquid or semi-fluid glyceride shortenings derived from animal, vegetable or marine fats and oils including synthetically prepared shortenings. These glycerides can contain saturated or unsaturated "long-chain" acyl radicals having from about 12 to about 22 carbon atoms such as lauroyl, lauroyleoyl, myristoyl, myristoleoyl, palmitoyl, palmitoleoyl, stearoyl, oleoyl, linoleoyl, linolenoyl, arachiodoyl, arachidenoyl, behenoyl, erucoyl and the like and are generally obtained from edible oils and fats such as cottonseed oils, soybean oil, coconut oils, rapeseed oil, peanut oil, olive oil, palm oil, pal kernel oils, sunflower seed oil, rice bran oil, corn oil, sesame seed oil, safflower oil, wallflower oil, pilchard oil, lard, tallow and the like. These glycerides can also contain in part one or two short-chain acyl groups having from 2 to about 6 carbon atoms such as acetyl, propanoyl, butanoyl, valeryl, and caproyl; they can be prepared by random or low-temperature inneresterification reactions of fatty triglyceride-containing oils and fats such as inneresterified or rearranged cottonseed oil and lard; and they can be otherwise formed by various organic syntheses.

Preferably, the shortening should be of the so-called emulsified variety, containing up to 50%, and more normally about 5–25%, by weight, of one or more suitable emulsifiers. The partially esterified polyhydric compounds having surface active properties are an example of appropriate emulsifiers. This class of emulsifiers includes, among others, mono- and di-glycerides of fatty acids, such as monobeherin, monostearin, monopalmitin, monoolein, and dipalmitin; partial fatty acid esters of glycols, such as propylene glycol monostearate and monobehenate; higher fatty acid esters of sugars, such as the partial palmitic and oleic esters, of sucrose; and phosphoric and sulfuric acid esters such as dodecyl glyceryl ether sulfate and monostearin phosphate. Other examples are the partial esters of hydroxy carboxylic acids, such as lactic, citric, and tartaric acids, with polyhydric compounds, for example, glyceryl lactopalmitate, and the polyoxyethylene ethers of fatty esters of polyhydric alcohols, such as a polyoxyethylene ether of sorbitan monostearate or distearate. Fatty acids alone or esterified with a hydroxy carboxylic acid, e.g., stearyl-2-lactylate, are also useful.

Preferably, the emulsifier is any one or a combination of the various alpha phase crystal tending emulsifiers disclosed in U.S. Patents 3,145,108 and 3,145,109 issued to Howard on Aug. 18, 1964 and in U.S. Patent 3,145,110 issued to Abbott on Aug. 18, 1964. Examples of such alpha phase crystal tending emulsifiers are propylene glycol monostearate, acetylated mono- or di-glycerides, and lactylated mono- or di-glycerides.

Another ingredient which is preferably used in conjunction with the shortening of these mixes is a high temperature batter stabilizer such as stearic acid, malic stearate, and octadecyl hydrogen succinate or any of the high temperature batter stabilizers which are disclosed in U.S. Patents 3,145,108, 3,145,109, 3,145,110 and are also disclosed in U.S. Patent 3,168,405 issued to Howard and Martin on Feb. 5, 1965. The high temperature batter stabilizer is preferably used in an amount of from about 0.25 to about 4.0% by weight of the shortening.

The selection of a chemical leavening system from among those known in the art poses no problem for one skilled in the formulation of culinary mixes. In general such systems are composed of baking soda, e.g., sodium, potassium, or ammonium bicarbonate, on the one hand, and one or more phosphates or other common baking acids on the other. Suitable baking acids include monocalcium phosphate, dicalcium phosphate, sodium acid pyrophosphate, potassium acid tartrate, monosodium phosphate, sodium aluminum phosphate, and sodium aluminum sulfate, among others. The amount of soda and the selected acid are so balanced as to achieve a pH in the resultant batter of about 6 to 10. Frequently, provision of a slight excess of soda is advantageous so as to assure absence of unreacted acid/or to compensate for the acid tendency of some batter ingredients.

For many mixes it is accepted practice for the housewife to add the required amount of eggs in the course of batter preparation and this practice can be followed just as well in the present mixes. If desired, the inclusion of egg solids in the mix is an allowable alternative. The function and permissible variations in the remaining ingredients are sufficiently apparent to render the detailed explanation thereof unnecessary.

It is to be understood that a wide variety of cakes can be prepared from mixes which contain the above named ingredients, but, for purpose of illustration, a specific application of this invention to layer cake mixes will be set forth in detail. The composition of the dry mixes of this invention which are suitable for baking layer cakes can vary but representative compositions are within the following ranges:

| Ingredient | Percent by weight of dry mix |
|---|---|
| Amylopectin | 0.1–4.0 |
| Starch | 1.0–5.0 |
| Starch phosphate | 0–3.0 |
| Flour | 20–50 |
| Sugar | 20–70 |
| Shortening | 4–26 |
| Leavening agents | 0.5–4 |
| Egg solids | 0–5 |
| Hydrolphilic colloids | 0–1 |
| Non-fat dried milk solids | 0–5 |
| Cocoa | 0–10 |
| Flavoring (including spices) | 0–2 |
| Coloring | Minor amounts |

The exact method of compounding the dry mixes of this invention is not critical, although very satisfactory results are obtained by mixing in a ribbon blender: The flour, sugar, and shortening, are blended into a homogeneous premix. This premix can be passed through an impact grinder to eliminate lumps. Additional ingredients can then be added and the whole again mixed. An additional step of impact grinding may be desirable to remove any lumps present in the final dry mix.

Another method of preparing the dry mix is by the method disclosed in U.S. Patents 2,874,051 issued to Bedenk et al., 2,874,052 issued to Bedenk, and in 2,874,053 issued to Mills on Feb. 17, 1959 in which a homogenous blend is formed containing sugar, flour and shortening, and this blend is then subjected to simultaneous shearing and crushing forces.

The manner in which the essential ingredients of the invention, i.e., the amylopectin and starch, and also the optional starch phosphate, are added to the dry mix is not critical, so long as they are mixed with the other components. Thus, the amylopectin and starch ingredients can be added, together or separately, to a sugar-flour-shortening premix during the blending thereof. Equally satisfactory, is the addition of these special ingredients, together or separately, to the other components before the addition thereof to the sugar, flour and shortening.

All types of flour-based prepared layer cake mixes and layer cake batters can be made with the products of this invention. White cakes, yellow cakes, chocolate cakes, devils food cakes, marble cakes, spice cakes, high ratio as well as low ratio cakes, and many other layer cakes of excellent quality can be prepared simply by mixing the layer cake ingredients together with water in a single mixing step, or multiple mixing steps, followed by baking. These layer cake mixes and batters can tolerate a significantly greater amount of water than can the layer cake mixes and batters heretofore known because they contain the cooperative amylopectin and starch ingredients.

The addition of amylopectin and starch ingredients, of the type and amount described above, enables layer cakes prepared from the mixes of this invention to be more moist than cakes prepared from compositions heretofore known and at the same time these cakes have very desirable characteristics such as good crust appearance and freedom from gumminess or pastiness. These cakes are also very tender, tasty and in other ways delectable.

Addition of the moisture enhancing ingredients of this invention to a conventional type cake mix allows layer cakes to be formulated at a water/solids ratio of from 0.45:1.0 to about 0.90:1.00 by weight. This contrasts with previously known mixes not containing these special ingredients wherein attempts to prepare layer cakes having a water/solids ratio greater than about 0.60:1 results in cakes which are too pasty and/or gummy, of poor crust appearance, or even devoid of normal cake structure. "Water/solids ratio," as used herein, refers to the amount of water per se added to the dry mix; it does not include water from eggs or moisture inherently present in other ingredients.

Also, cakes prepared from the mixes of this invention retain their desirable moistness properties for a long period of time, for instance, for as long as 4 or 5 days after baking even when stored uncovered and unprotected from the atmosphere.

*Example I.—Devil's Food Cake*

Five dry layer cake mixes (A, B, C, D and E) were prepared by blending together thoroughly sugar, flour, and shortening in a conventional heavy duty mixer, and passing this blend through a standard roller mill. After the milling step, the minor ingredients shown below in addition to the sugar, flour, and shortening were added. The mixture then was subjected to an impact grinding to break up any agglomerates or large particles present.

*Dry mix-basic composition*

| Ingredient | Percent by weight of dry mix |
|---|---|
| Sugar (industrial fine granulated sucrose and dextrose) | 46.8 |
| Flour (soft wheat cake flour) | 31.0 |
| Shortening (a mixture of tallow and directly rearranged lard hydrogenated to an iodine value of about 55 containing about 7% by weight of rapeseed monoglyceride hardened to an iodine value of about 8 and also containing about 2% by weight of propylene glycol monostearate) | 11.0 |
| Cocoa | 6.0 |
| Non-fat dried milk solids | 1.4 |
| Salt | 1.0 |
| Soda | 2.1 |
| Monocalcium phosphate | 0.2 |
| Sodium acid pyrophosphate | 0.2 |
| Carboxymethyl cellulose | 0.1 |
| Flavoring | 0.2 |

In addition to the conventional ingredients shown above, the five cake mixes respectively contained the amylopectin and starch ingredients shown in Table 1 below. These special ingredients were added to the mix along with the minor ingredients.

Batter was then made by adding water in an amount shown in Table 1 below to 540 grams of each mix. Two eggs were then added and the batter was mixed at medium speed on a home style electric mixer for two minutes. Two eight inch round pans were filled with each batter. One pan of each batter was baked at 350° F. for approximately thirty-five minutes and the other pan of each batter was baked at 400° F. for approximately thirty minutes.

After baking, the cakes were allowed to cool at room temperature for thirty seconds; the center and edge heights were then measured for each cake as this is an indication of proper cake structure. The crust appearance was also noted and each cake was then tasted for eating quality; these data are recorded below in Table 1.

for three days. Each day, the cakes were tested and the eating quality recorded in Table 2 below.

TABLE 2.—MOISTURE RETENTION IN DEVIL'S FOOD CAKES

| Time, days | Cake B (see Example I) | Cake D (see Example I) |
| --- | --- | --- |
| 0 (fresh) | Moist, pasty | Moist, nonpasty. |
| 1 | Slightly dry, pasty | Moist, slightly pasty. |
| 2 | Dry | Do. |
| 3 | Very dry, very musty | Moist, slightly musty. |

TABLE 1.—THE EFFECT OF AMYLOPECTIN AND STARCH INGREDIENTS ON THE CAKE SIZE AND EATING QUALITY OF DEVIL'S FOOD CAKES

| Cake | Moisture Enhancing Ingredients, Weight Percent of Dry Mix | | | Water Level, grams | Center/Edge Height, inches | | Eating Quality | | | | | Crust Appearance |
| --- | --- | --- | --- | --- | --- | --- | --- | --- | --- | --- | --- | --- |
| | Starch (from rice) | Amylopectin (from waxy maize) | Amylopectin (from corn starch) | | 400° F. | 350° F. | Dry | Gummy | Moist | Pasty | Other | |
| A | | | | 320 | 2.56/1.64 | 2.40/1.77 | Yes | Yes | No | No | | Smooth. |
| B | | | | 360 | 2.35/1.56 | 2.21/1.75 | No | No | Yes | Yes | | Cracks and wrinkles. |
| C | 3.0 | 0.75 | | 360 | 2.46/1.58 | 2.30/1.74 | No | No | Yes | No | Tender; cool. | Smooth. |
| D | 3.0 | 0.50 | 1.0 | 360 | 2.55/1.62 | 2.38/1.88 | No | No | Yes | No | do | Do. |
| E | 3.0 | | 1.0 | 360 | 2.54/1.64 | 2.30/1.68 | No | No | Yes | No | do | Do. |

It can be observed from Table 1 that the combination of amylopectin and starch allows the preparation of a devil's food cake which contains an increased amount of water and, at the same time, has desirable physical characteristics. For instance, Cake A, which represents a conventional devil's food cake without these special ingredients had a water level of 320 grams (a water/solids ratio of 0.59:1) and was dry and gummy. Cake B was identical to Cake A except the water level was increased to 360 grams (a water/solids ratio of 0.67:1) and although this cake was moist, it was also undesirably pasty. Also, it can be seen from the center/edge height ratio data that Cake B had a less desirable structure than did the other cakes. However, Cakes C, D and E, which also contained 360 grams of water and were identical to Cake B except for the addition of amylopectin and starch combinations, were moist but not unduly gummy or pasty and were further characterized by a good cake structure and a desirable crust appearance. Also, the cakes prepared from the mixes of this invention (C, D, E) gave a desirable cool and tender sensation in the mouth.

Substantially similar results are observed in Example I with other types of cakes, e.g., a spice cake when prepared in the same manner as the devil's food cake of Example I.

*Example II*

This example illustrates how the special moisture enhancing ingredients of this invention allow the preparation of a moist cake which retains this desirable characteristic for sustained periods of time.

Cakes B and D of Example I were allowed to stand exposed to the atmosphere (68–75° F. and 35–55% RH)

It can be observed from Table 2 that Cake D, containing amylopectin and starch, remained moist and was only slightly musty after three days of exposed storage. The same cake, B, but not containing these ingredients, became very dry and musty under the same conditions.

*Examples III–X*

In the following examples a yellow-type layer cake is prepared containing the following dry ingredients:

*Yellow cake*

| Ingredient | Percent by weight |
| --- | --- |
| Sugar, industrial fine granulated sucrose | 45.5 |
| Cake flour | 39.0 |
| Shortening (a mixture of vegetable oil and directly rearranged lard, hydrogenated to an I.V. of about 55) | 11.7 |
| Dry milk solids | 0.2 |
| Salt | 0.5 |
| Soda | 1.3 |
| Sodium acid pyrophosphate | 0.3 |
| Carboxymethyl cellulose | 0.3 |
| Flavor | 1.2 |

This mix is prepared in the same manner as the mix of Example I. Amylopectin and starch ingredients of the type and amount shown in Table 3 below are added to the above mix and a cake batter is prepared therefrom by adding two eggs, 0.67 gram of water per gram of mix, and mixing for two minutes on a home style electric mixer at medium speed. The resulting batter is then divided into 489 gram portions, poured into eight inch round pans, and baked at 350° F. for 30–50 minutes.

TABLE 3.—AMYLOPECTIN AND STARCH INGREDIENTS IN YELLOW-TYPE LAYER CAKE

| Example | Amylopectin | | Starch Phosphate, Percent By Weight of Dry Mix | Starch | |
| --- | --- | --- | --- | --- | --- |
| | Source | Percent By Weight of Dry Mix | | Source | Percent By Weight of Dry Mix |
| III | Waxy maize | 0.1 | 0.05 | Rice | 1.0 |
| IV | Waxy sorghum | 0.5 | 0.5 | Corn | 2.0 |
| V | Tapioca hybrid | 3.0 | 1.0 | Potato | 3.0 |
| VI | 1:1, Waxy maize: waxy sorghum | 4.0 | 0.25 | Pineapple | 4.0 |
| VII | Corn starch | 3.0 | 0.0 | Rye | 5.0 |
| VIII | do | 2.0 | 0.0 | Barley | 4.0 |
| IX | Potato starch | 2.5 | 3.0 | Oats | 3.0 |
| X | Rice starch | 1.0 | 0.75 | Potato | 2.0 |

All of the cakes of Examples III–X exhibit highly desirable moisture characteristics, have good cake structure and crust appearance, are free from undue gumminess or pastiness, and remain moist for several days after baking.

*Example XI.—White cake*

A dry mix suitable for the preparation of a white-type layer cake was prepared in the same manner as the dry mix of Example I. The ingredients of this mix were:

| Ingredients | Percent by weight of dry mix |
|---|---|
| Sugar (industrial fine granulated sucrose and dextrose) | 41.4 |
| Flour (soft wheat cake flour) | 39.8 |
| Shortening (a mixture of tallow and directly rearranged lard hydrogenated to an iodine value of about 55 containing about 6% by weight of rapeseed monoglyceride hardened to an iodine value of about 8 and also containing about 5% by weight of propylene glycol monostearate) | 9.5 |
| Non-fat dried milk solids | 2.0 |
| Salt | 0.7 |
| Soda | 1.0 |
| Sodium aluminum phosphate | 0.8 |
| Mono-calcium phosphate monohydrate | 0.4 |
| Vanilla | 0.4 |
| Amylopectin (from fractionation of corn starch) | 1.0 |
| Rice starch | 3.0 |

A batter was then prepared by adding 360 grams of water to 540 grams of the dry mix (a water/solids ratio of 0.67:1). The whites of two eggs were added and the batter was mixed at medium speed on a home style electric mixer for two minutes. The batter was then poured into eight inch round cake pans and baked for 25–30 minutes at 400° F.

The cake was allowed to cool at room temperature and was then observed both as to eating quality and physical structure. The cake had a desirable structure and appearance; it was moist, and in general, it was a delectable cake.

While the invention has been described primarily in its application to dry prepared mixes for layer cakes, variations and modifications thereof can be made without departing from the spirit and scope of the invention. For instance, the concept of the invention can well be applied to culinary mixes other than layer cake mixes. However, the present invention is not applicable to foam type cakes of the conventional angel food variety which do not contain shortening or other foam type cakes such as chiffon cake in which air is incorporated into a non-fat containing protein foam. Nor is this invention applicable to cakes which are not flour based; for example, cakes in which the farinaceous ingredient is granular starch.

What is claimed is:

1. A dry prepared culinary mix containing sugar, flour, shortening, fractionated amylopectin in an amount ranging from about 0.1 to about 4.0% by weight of the dry mix, and a starch having a gelatinization temperature higher than that of wheat starch in an amount ranging from about 1.0 to 5.0% by weight of the dry mix.

2. The dry prepared culinary mix of claim 1 which contains from about 0.25 to about 1.50% by weight of the amylopectin and from about 2.0 to about 3.0% by weight of the starch.

3. The dry prepared culinary mix of claim 1 wherein the amylopectin is derived from the fractionation of corn starch.

4. The dry prepared culinary mix of claim 1 wherein the starch is selected from the group consisting of rice starch, corn starch and pineapple starch.

5. The dry prepared culinary mix of claim 1 wherein an additional ingredient is starch phosphate in an amount ranging from about 0.05 to about 3.0% by weight of the dry mix.

6. A dry prepared culinary mix comprising on a weight basis from 20% to 70% sugar, from 20% to 50% flour, from 4% to 26% shortening, from 0.1% to 4% fractionated amylopectin, and from 1% to 5% of a starch having a gelatinization temperature higher than that of wheat starch.

7. The dry prepared culinary mix of claim 6 wherein an additional ingredient is starch phosphate in an amount ranging from about 0.05 to about 3.0% by weight of the dry mix.

8. The method of increasing the moisture tolerance of a dry prepared culinary mix containing sugar, flour, and shortening, which comprises adding to the dry mix:
    (a) fractionated amylopectin in an amount ranging from about 0.1 to about 4.0% by weight of the dry mix;
    (b) starch having a gelatinization temperature higher than that of wheat starch in an amount ranging from about 1.0 to 5.0% by weight of the dry mix.

9. The method of claim 8 wherein starch phosphate in an amount ranging from about 0.05 to about 3.0% by weight of the dry mix is added as an additional ingredient.

References Cited

UNITED STATES PATENTS

| 3,037,864 | 6/1962 | Bedenk | 99—94 |
| 3,193,389 | 7/1965 | Dehne | 99—90 |
| 3,268,337 | 8/1966 | Howard et al. | 99—92 |

FOREIGN PATENTS

| 557,921 | 5/1958 | Canada. |

RAYMOND N. JONES, *Primary Examiner.*